United States Patent
Naveau et al.

(10) Patent No.: US 12,023,843 B2
(45) Date of Patent: Jul. 2, 2024

(54) STRETCHING AND COOLING ROD FOR FORMING CONTAINERS

(71) Applicant: SIDEL PARTICIPATIONS, Octeville-sur-Mer (FR)

(72) Inventors: Laurent Naveau, Octeville-sur-Mer (FR); Régis Bechen, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 18/131,162

(22) Filed: Apr. 5, 2023

(65) Prior Publication Data
US 2023/0330911 A1   Oct. 19, 2023

(30) Foreign Application Priority Data
Apr. 13, 2022   (FR) ...................... 2203421

(51) Int. Cl.
| | |
|---|---|
| *B29C 49/12* | (2006.01) |
| *B29C 49/64* | (2006.01) |
| *B29C 49/66* | (2006.01) |
| B29K 67/00 | (2006.01) |
| B29L 31/00 | (2006.01) |

(52) U.S. Cl.
CPC ...... *B29C 49/1212* (2022.05); *B29C 49/1215* (2022.05); *B29C 49/6604* (2022.05); *B29C 2049/6606* (2022.05); *B29K 2067/003* (2013.01); *B29L 2031/7158* (2013.01)

(58) Field of Classification Search
CPC ........... B29C 49/1212; B29C 49/1215; B29C 49/6604; B29C 2049/6606
See application file for complete search history.

(56) References Cited

U.S. PATENT DOCUMENTS

| | | | | |
|---|---|---|---|---|
| 4,889,752 A | * | 12/1989 | Beck | ..................... B29C 49/071 |
| | | | | 215/373 |
| 5,213,752 A | | 5/1993 | Miyazawa | |
| (Continued) | | | | |

FOREIGN PATENT DOCUMENTS

| | | |
|---|---|---|
| EP | 0036844 A1 | 9/1981 |
| EP | 3088160 B1 * | 10/2017 |
| JP | 2001088202 A | 4/2001 |

OTHER PUBLICATIONS

French Search Report for FR2203421 dated Nov. 10, 2022.

*Primary Examiner* — Robert B Davis

(57) ABSTRACT

Provided is a stretching rod for a molding unit for manufacturing a container from a preform and a method for manufacturing a container by stretch blow-molding. The stretching rod extends longitudinally, parallel to a main axis Y, and comprises a body of cylindrical or tubular form, a distal end in the extension of said body, at least one internal channel to allow the circulation of a cooling gas to said distal end, a flat situated at the distal end of the stretching rod, an end-fitting protruding from said flat and a plurality of orifices, said orifices being fluidically connected with said internal channel and being distributed around said end-fitting on said flat. The rod can include an annular skirt in the extension of said body, at said distal end, said skirt having a height less than the height of said end-fitting.

11 Claims, 10 Drawing Sheets

(56) References Cited

U.S. PATENT DOCUMENTS

| | | | |
|---|---|---|---|
| 2009/0160102 A1* | 6/2009 | Schuster | B29C 49/12 425/529 |
| 2011/0193271 A1* | 8/2011 | McCrary | B29C 49/12 425/535 |
| 2021/0107205 A1 | 4/2021 | Eble | |

* cited by examiner

[Fig. 1]
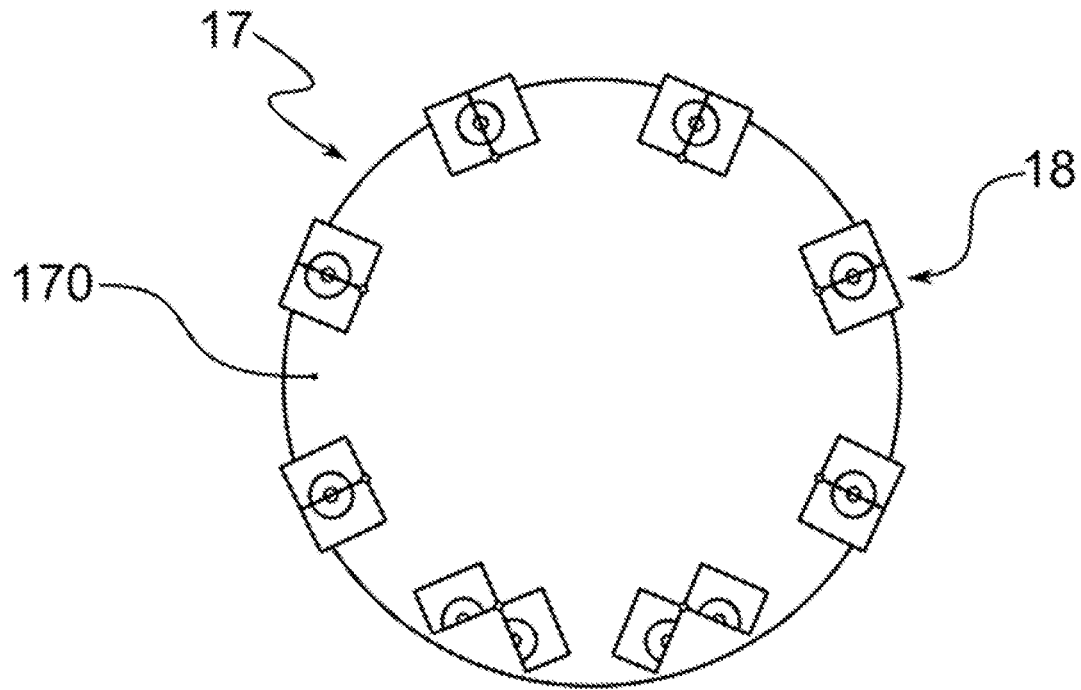
[Fig. 2]
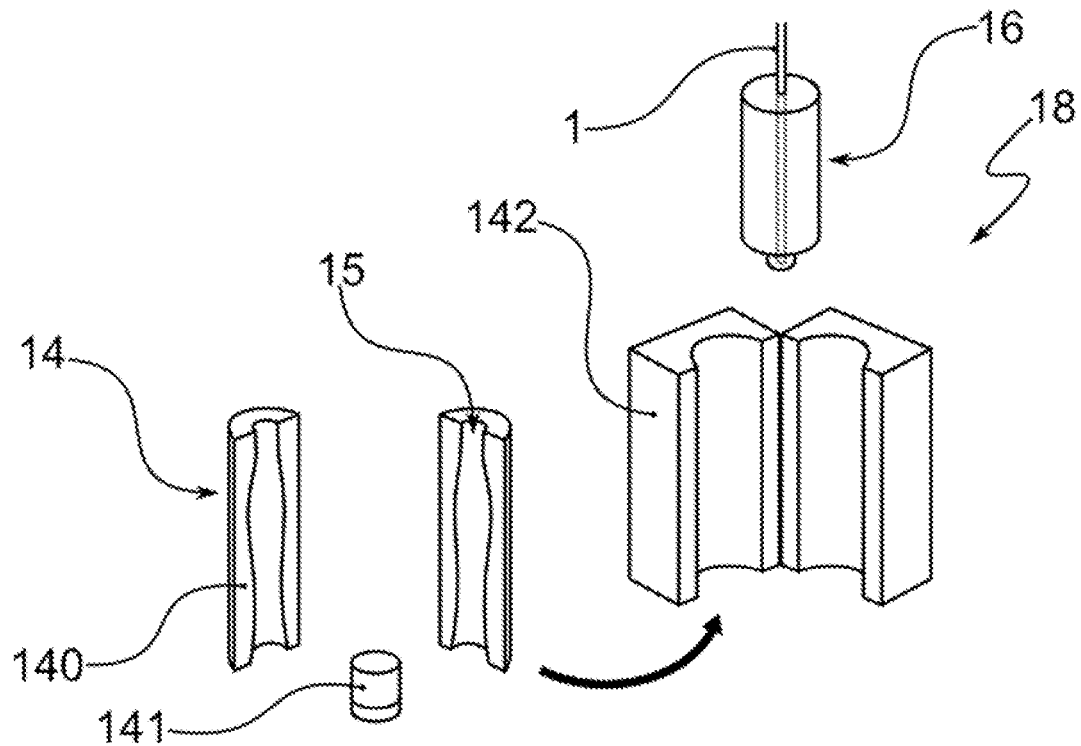

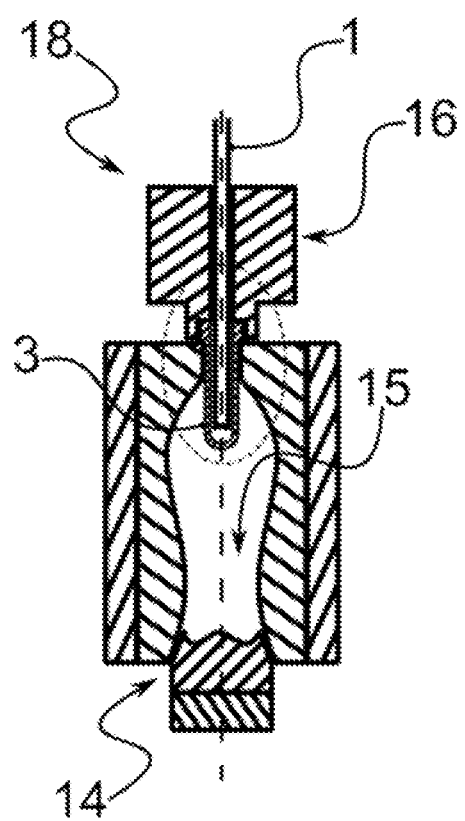
[Fig. 3]

[Fig.4]
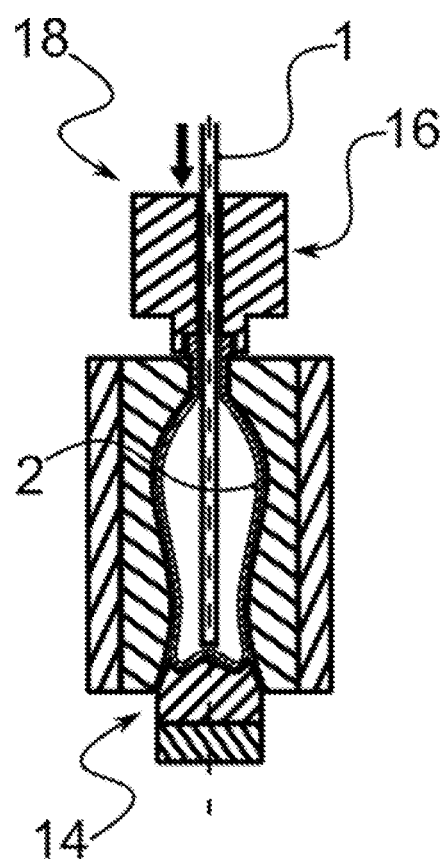

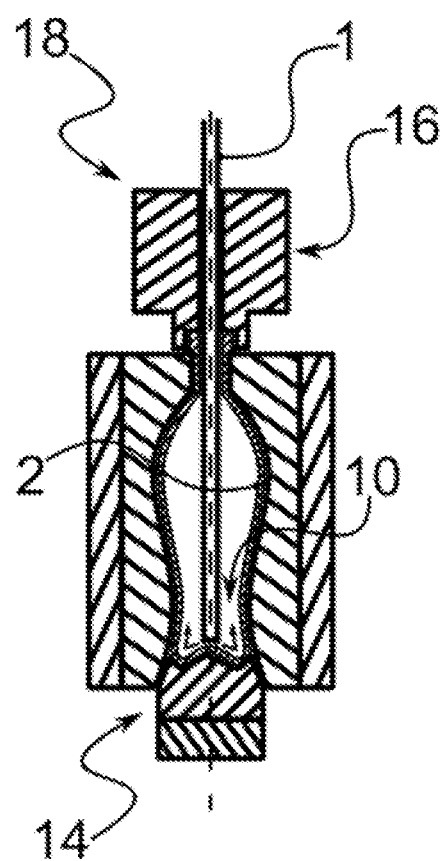
[Fig.5]

[Fig.6]
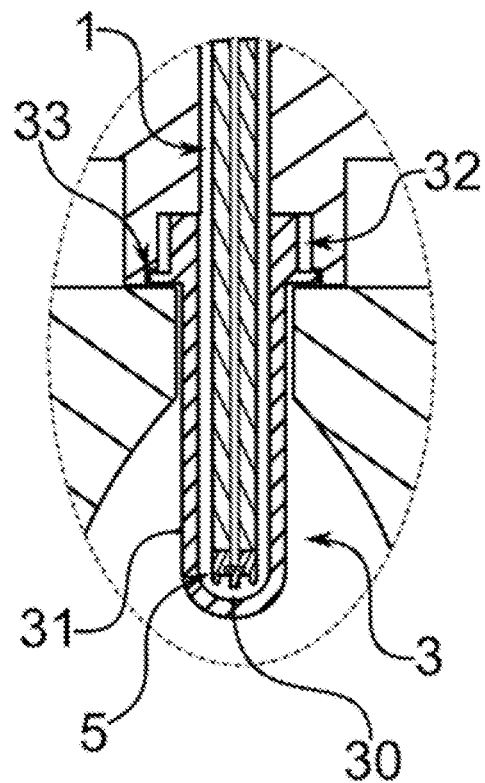
[Fig.7]
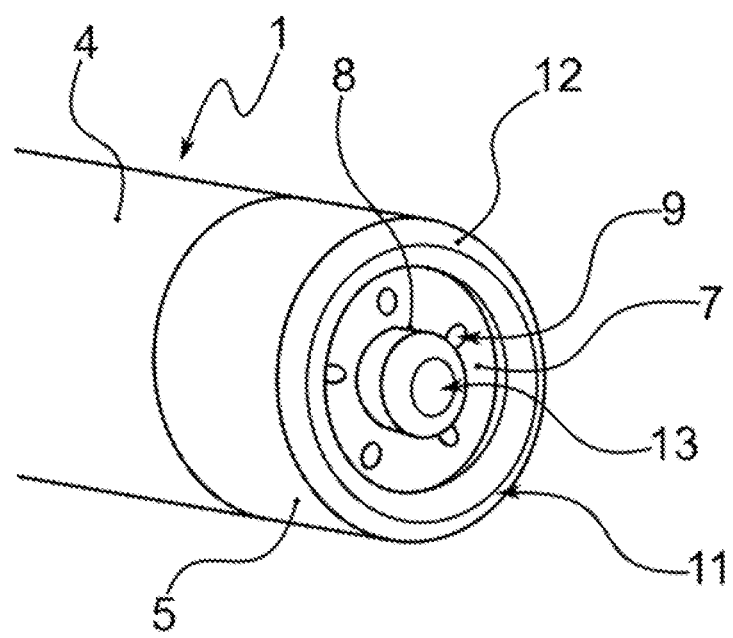

[Fig.8]
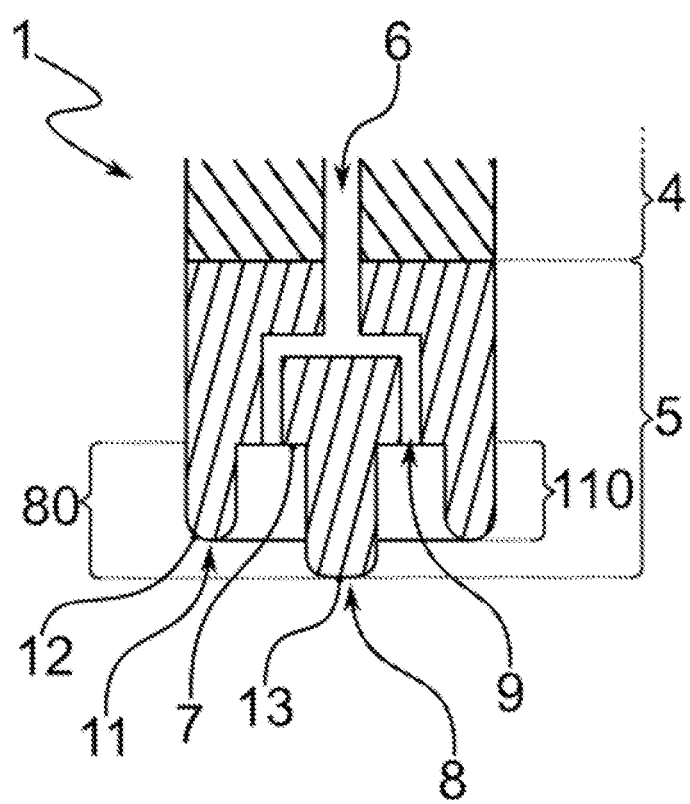

[Fig.9]
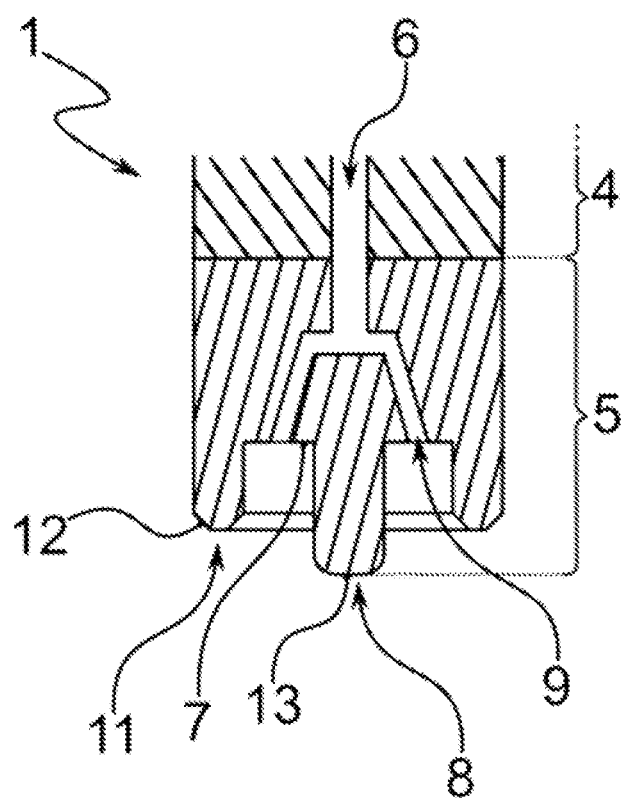

[Fig.10]
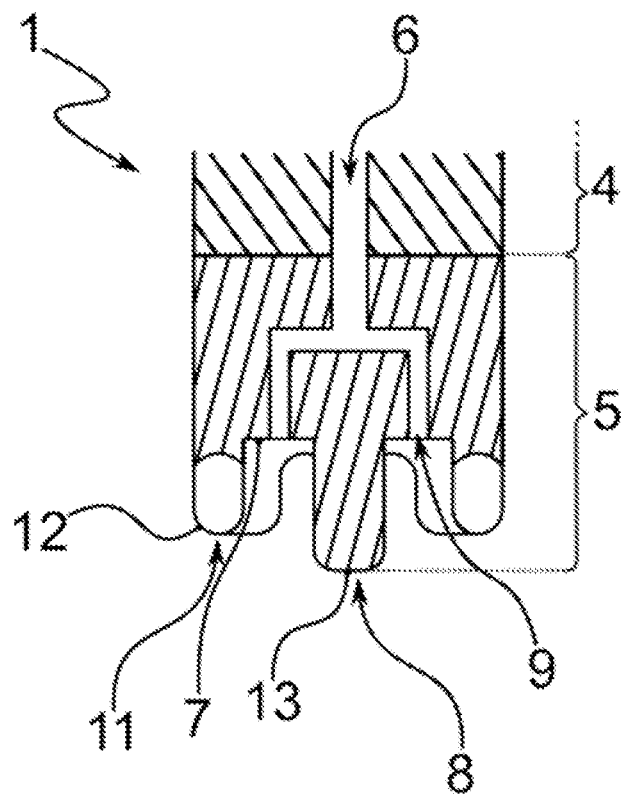
[Fig.11]
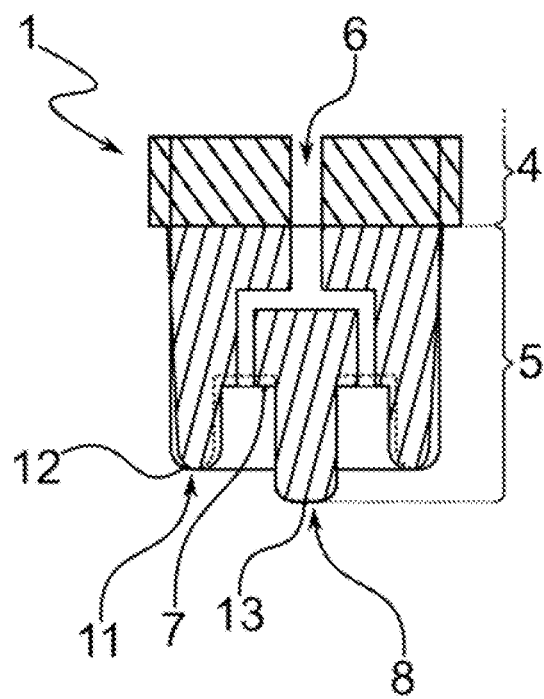

[Fig.12]
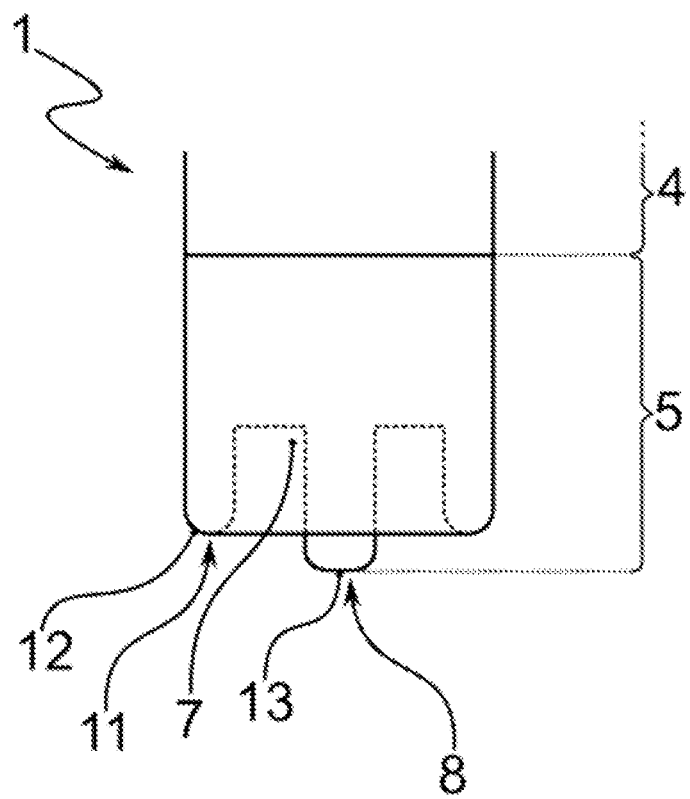
[Fig.13]
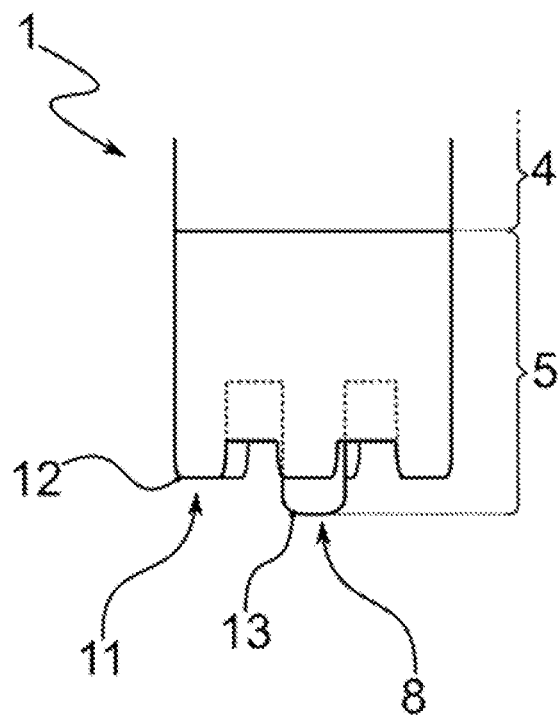

[Fig.14]
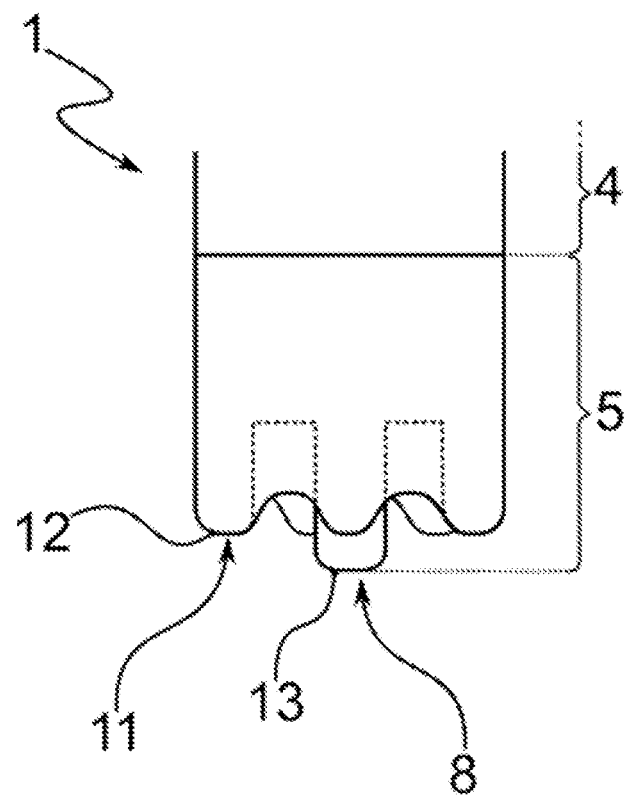
[Fig.15]
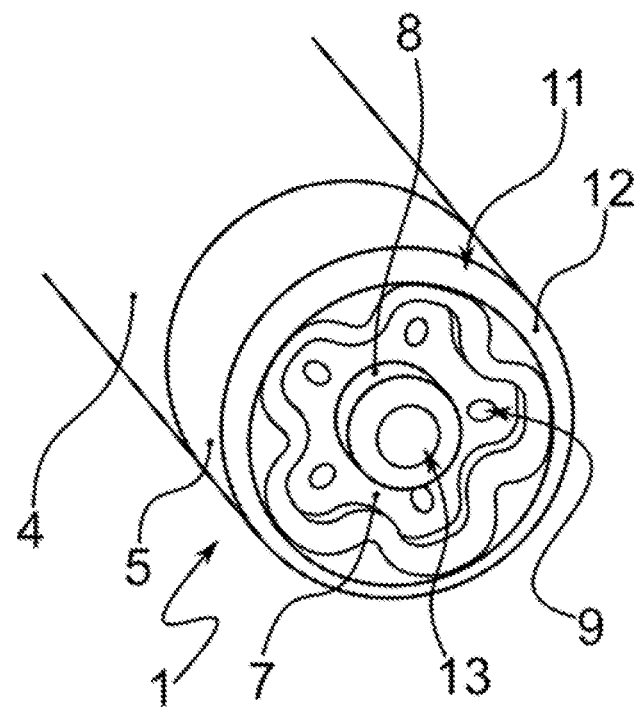

STRETCHING AND COOLING ROD FOR FORMING CONTAINERS

Technical field: The present invention relates to the field of the manufacturing of containers by blowing or stretch blow-molding from preforms made of thermoplastic material, such as, for example, polyethylene terephthalate, hereinafter "PET". Its subject is more particularly a stretching and cooling rod intended to be implemented in a stretch-blow molding technique for forming containers. Another object is a method for manufacturing containers implementing the stretching and cooling rod according to the invention.

State of the art: It is known practice to form containers made of thermoplastic material by stretch blow-molding of preforms previously heated to a temperature that is sufficient to soften the walls thereof. To this end, a forming device is used which comprises a mold having a cavity shaped to the die of the container to be obtained. The previously heated preform is received in the cavity. Then, its walls are subjected to a so-called "biaxial" stretching so as to hug the die of the mold. For this, the preform is stretched axially by means of a stretching rod to provoke the axial expansion of the preform. Simultaneously with this stretching operation, a pressurized fluid is injected into the preform so as to provoke the radial expansion of the wall.

Such a forming method is well known. For the final container to have a bottom that is perfectly molded, it is preferable for the stretching rod to be adapted to guarantee a satisfactory thickness of the wall of the container. A bad distribution of the material is a recurrent defect found on the containers produced by a molding and stretch blow-molding method. What is required is not necessarily to be careful to ensure that the thickness of the wall of the container is constant, because in certain cases it may be desirable to thicken certain zones, in particular those intended to undergo significant strains (notably in proximity to the bottom). It is rather to ensure that the thickness of material corresponds to the specifications of the container, as defined according to its form and its use.

A material defect located at the center can, furthermore, generate zones that are hotter and sensitive to collapse. In order therefore to perfect the structure of the blown bottom, and to fix the material with respect to the die of the mold, an additional step of internal cooling can prove very useful. This step consists in generating a cooling of the bottom by the stretching rod, at the end of the blowing phase, over a very short time, at very localized points of the bottom.

Methods have thus been developed to promote a distribution of the material matched to demanding specifications.

Furthermore, in the field of the manufacturing of containers by molding and stretch blow-molding, use is increasingly being made of recycled PET, for environmental reasons. This material further increases the problem of distribution of the material because it exhibits different heat absorption properties: the control of the cooling of the container thus formed is therefore even more critical.

Moreover, despite the details provided for the stretch blow-molding methods, there are therefore still problems of deformation of the bottom after removal of the bottle from the mold, notably because of a lack of control of the cooling phase.

Technical background: The document JP2001088202 proposes a stretching and cooling rod, having orifices specifically provided for cooling the bottom of a preform.

These orifices are situated on the body of the rod, above the end-fitting formed at the end of said rod. The end-fitting is provided to be placed in contact with the bottom of the preform during the stretching, but slightly set back during the cooling phase, to allow the gas to escape from the orifices and, thereby, cool the bottom, at the end of the blowing phase. Nevertheless, in this configuration, the cooling gas escapes in an uncontrolled manner, and is not directed precisely, in a way localized toward the bottom of the container that is obtained.

Summary of the invention: The current solutions are not satisfactory and there is a need to further improve the cooling step in order to obtain containers of better quality.

The invention aims to resolve this problem and, to this end, proposes a stretching rod which ensures a stretching of the preform along its axis, by avoiding the undesirable contacts between the outside of the rod and the inside of the body of the preform, while improving the distribution of the cooling gas, notably on the bottom of the container that is obtained. The trajectory of the cooling gas is controlled and mastered through the use of a stretching rod in accordance with the invention.

To this end, the invention relates to a stretching rod for a molding unit for manufacturing a container from a preform, said stretching rod extending longitudinally, parallel to a main axis Y, comprising
- a body of cylindrical or tubular form;
- a distal end in the extension of said body;
- at least one internal channel to allow the circulation of a cooling gas to said distal end;
- a flat situated at the distal end of the stretching rod;
- an end-fitting protruding from said flat, and
- a plurality of orifices, said orifices being fluidically connected with said internal channel and being distributed around said end-fitting on said flat.

Said stretching rod is characterized in that it comprises an annular skirt in the extension of said body, at said distal end, said skirt having a height less than the height of said end-fitting.

Advantageously, the edges of the skirt and/or the end of the end-fitting protruding from the stretching rod are rounded.

According to embodiments, the outer body and the skirt comprise a single piece.

Advantageously, the end-fitting of the stretching rod is of conical form.

In embodiments, the flat extends orthogonally to the main axis Y.

In embodiments, the orifices are oriented outward in the direction of the main axis Y, and by an angle of between 1 and 50 degrees, preferentially by an angle of 30 degrees.

Advantageously, the annular skirt of the stretching rod has a crenelated form.

In embodiments, the annular skirt of the stretching rod has a crenelated form with rounded and convex peak edges and concave trough edges.

Advantageously, the flat of the stretching rod has a recess in the form of an internal rosette.

The invention relates also to a method for manufacturing a container by stretch blow-molding implementing the stretching rod according to the invention, comprising at least the following steps of
- placing a previously heated preform in a blowing mold having, in closure position, a molding cavity forming the die of the container to be blown;
- closing said blowing mold;
- blowing said preform in the blowing mold via a blowing nozzle and, substantially simultaneously, a step of stretching said preform by inserting the stretching rod inside said preform by bearing against the bottom of said preform so as to facilitate the axial elongation of said preform;

cooling the inside of said container that is thus formed by injection of air via said stretching rod, provided with said plurality of orifices provided for this purpose, retracting said stretching rod;

extracting said blown container by opening said blowing mold.

Brief description of the figures: The invention will be better understood from the description below which is based on possible embodiments, explained illustratively and in a nonlimiting manner, with reference to the attached figures, in which:

FIG. 1 schematically represents a simplified top view of an example of embodiment of a molding machine of rotary type, notably illustrating the molding units (without the blowing and stretching means) distributed around a carousel, said blowing units being, depending on their relative position with respect to the input or the output of the machine, in open position or in closed position;

FIG. 2 schematically represents a partial perspective view of one of the molding units of the machine according to the exemplary embodiment of FIG. 1, illustrating in particular, outside of the unit in open position, an exploded view of a mold produced in three parts, namely two half-molds and a mold bottom;

FIG. 3 schematically represents a vertical longitudinal median cross-sectional view of a molding unit of the machine, during a first step of a container blowing cycle, showing in particular the insertion of the distal end of the rod into a preform enclosed in a mold;

FIG. 4 schematically represents a view similar to FIG. 3, during another subsequent step at the end of the blowing cycle, showing in particular the distal end of the rod introduced into the blown container and extending to the bottom of said blown container;

FIG. 5 schematically represents a view similar to FIG. 3, during another subsequent step of the blowing cycle at the time of cooling, showing in particular the end-fitting protruding from the stretching rod;

FIG. 6 schematically represents a detail view of FIG. 3, with the stretching rod positioned at the bottom of the preform;

FIG. 7 schematically represents a perspective view of an exemplary embodiment of the distal end of the stretching rod, showing in particular an annular skirt having rounded edges;

FIG. 8 schematically represents a longitudinal median cross-sectional view of the first embodiment of FIG. 7;

FIG. 9 schematically represents a longitudinal median cross-sectional view of a second embodiment of the distal end of the stretching rod, showing in particular the annular skirt having orifices emerging through the flat with a direction at an angle with respect to the longitudinal axis of said rod, and the annular skirt furthermore having straight and beveled edges;

FIG. 10 schematically represents a longitudinal median cross-sectional view of a third embodiment of the distal end of the stretching rod, showing in particular the annular skirt having a crenelated form with rounded and convex peak edges and concave trough edges;

FIG. 11 schematically represents a longitudinal median cross-sectional view of a fourth embodiment of the distal end of the stretching rod, showing in particular the annular skirt with a profile converging from the body of said rod toward its distal end;

FIG. 12 schematically represents a side view of an embodiment of the distal end of the stretching rod, showing in particular a skirt with an annular edge inscribed in a same plane, as well as the end-fitting and the flat in dotted lines;

FIG. 13 schematically represents another side view of another embodiment, showing a skirt with straight crenelated edges, with peaks and troughs;

FIG. 14 schematically represents a side view of an embodiment, showing a skirt with rounded crenelated edges; and FIG. 15 schematically represents a perspective view of an exemplary embodiment of the distal end of the stretching rod, showing in particular a recess in the form of a rosette on the flat.

Detailed description of the invention: Hereinafter in the description, elements that have an identical structure or similar functions will be designated by a same reference.

The invention is designed to be implemented in an installation for manufacturing containers 2. Such an installation comprises, normally, a molding machine as represented in FIG. 1, comprising at least molding units 18, each molding unit 18 comprising at least blowing means incorporating a stretching rod 1, said mold 14 comprising at least two half-molds 140 which each have an inner molding face and which are respectively mounted on supports 142 that are movable about an axis Y, between at least one open position and one closed position of the molding unit 18, in which said inner faces of said at least two joined half-molds 140 together delimit a molding cavity 15 for the container 2.

In practice, the blowing molds 14 are distributed circularly, in the form of a carousel 170, as can be seen in FIG. 1, and topped by respective blowing installations. In practice, always, and as can be seen in FIG. 2, the body of the blowing installation extends substantially vertically above the mold and substantially coaxially to the molding cavity 15 of the blowing mold 14.

FIG. 2 schematically represents a perspective view of one of the molding units 18 of the machine according to the exemplary embodiment of FIG. 1, illustrating in particular, outside of the unit in open position, an exploded view of a mold 14 produced in three parts, namely two half-molds 140 and a mold bottom 141.

All these elements are well known to the person skilled in the art and are not described in detail for a better understanding of the invention.

Reference is made to FIG. 3, showing a first embodiment of a rod 1 according to the invention, in a partial longitudinal cross-sectional view, which is implemented with a preform 3 made of PET or of recycled PET, intended to be stretched and blown in one of the blowing molds 14 of an installation described briefly above, so as to form a container 2, such as a bottle.

In FIG. 3, the stretching rod 1 is in high position and being inserted into the preform 3. The rod 1 is designed to be mounted in the body of the blowing installation described also above. Said stretching rod 1 extends longitudinally, parallel to the main axis Y. The stretching rod 1 according to the invention is a hollow stretching rod, which then has a dual function, a stretching function on the one hand and another function of cooling of the container on the other hand. For this, it has a first, so-called proximal end (not represented), that can be secured to a displacement device internal to the manufacturing installation.

As can be seen in FIG. 6, the preform 3 comprises, in a classic manner, a body of elongate and tubular form, of axis Y, limited by a wall 31 integral in the upper part with a threaded neck 32 and in the lower part with a substantially hemispherical bottom 30. Between the neck 32 and the body of the preform, a radial collar 33 protrudes outward from the preform 3.

Generally, the preform 3 illustrated in FIG. 6 has a symmetry of revolution about its axis Y.

When the preform is placed in the blowing installation, the axis Y of the rod 1 substantially coincides with the axis of revolution of the preform 3. Hereinbelow, Y will be used without distinction to designate the axis of the rod 1 or that of the preform 3.

Hereinbelow, "vertical" will be used to qualify any direction parallel to the axis of revolution of the rod and "transverse" will be used to qualify any direction at right angles to the axis of revolution of the rod.

As represented in FIG. 3, or also in FIG. 4, the stretching rod 1 comprises a cylindrical or tubular body 4. In embodiments, the body 4 of the stretching rod 1 can have a shoulder, that is to say have two longitudinal sections with two different diameters. That is particularly advantageous for the blowing of preforms of small diameter.

The body 4 also comprises a central internal channel 6 extending axially and connecting with a plurality of orifices 9 through which a cooling gas 10, in particular air, is injected into the manufactured container 2 in order to cool it. The orifices 9 are therefore fluidically connected with the internal channel 6. In the extension of the body 4, at the distal end 5, the stretching rod 1 comprises a flat 7. An end-fitting 8 protrudes from this flat 7.

As represented in FIG. 7, the stretching rod 1 further comprises an annular skirt 11 in the extension of its body 4.

FIG. 4 schematically represents another step of a blowing cycle, in which the stretching rod 1 is in low position and therefore placed at the bottom of the preform 3 during the blowing step. During this step, the preform 3 becomes a container 2.

FIG. 5 schematically represents an embodiment of another step of a blowing cycle, in which the stretching rod 1, still in low position, performs the cooling step, called sweep phase, of the container 2 thus formed by injection of the cooling gas 10. The cooling gas 10 then passes through the internal channel 6 of the stretching rod 1 to be diffused locally and precisely on the bottom of the container 2. The injection of the cooling gas is represented in the form of arrows in FIG. 5.

In embodiments, and as represented in FIG. 7, the diameter of the annular skirt 11 is equal to the diameter of the body 4 of the stretching rod 1. In this advantageous configuration, the cooling gas 10 is directed in a very localized manner.

In embodiments, the outer body 4 and the annular skirt 11 are obtained in a single piece. In other words, they form one and the same piece.

According to other embodiments, the outer body 4 and the annular skirt 11 are two separate pieces.

The structural modifications of the stretching rod 1 offer the advantage of directing the cooling gas 10 toward the bottom of the container 2, over all of its bottom surface, and thus improving the cooling step.

An embodiment can be seen in FIG. 7 in which the orifices 9, connected with the internal channel 6, are arranged and distributed on the flat 7, around said end-fitting 8. The orifices 9 allow the cooling gas 10 to be injected onto the bottom of the blown container. The orifices 9 are disposed on the flat 7, and over all of its circumference, therefore allowing the injection of the cooling gas 10 from the internal channel 6 to the interior of the blown container 2.

The orifices 9 are for example of cylindrical form and preferably have a diameter of between 0.3 and 3 millimeters (mm). They can also be of another form, for example of oblong form.

According to a preferred embodiment, the injection surface is between 3 and 6 millimeters square (mm 2) and does not exceed 20 millimeters square (mm 2). The injection surface corresponds to the sum of the diameters of the orifices 9. It represents the quantity of cooling gas 10 that can be injected by virtue of the configuration of the rod 1, comprising orifices 9 serving as restriction orifices. Thus, by virtue of the invention, it is possible to obtain an internal cooling of the formed container 1 while minimizing the consumption of cooling gas 10. The stretching rod 1 in fact has a very small dead volume and a design optimized for the internal cooling of a blown container 2.

The stretching rod 1 therefore has a plurality of orifices 9 disposed on the flat 7. The protruding end-fitting 8 can be of any form. In particular, said end-fitting 8 can be of conical form, of rounded conical form, of ovoid form, of hemispherical form, etc.

According to a preferred embodiment, as represented in FIG. 7, the flat 7 is at right angles to the body 4 of the stretching rod 1. That allows a better distribution and a better control of the cooling gas 10 which then escapes from the orifices 9 uniformly. FIG. 8 schematically represents a longitudinal median cross-sectional view of an exemplary embodiment of the distal end of the stretching rod 1, showing in particular an annular skirt 11 having rounded edges and an end-fitting 8 of cylindrical form. In this embodiment, the edges 12 of the annular skirt 11 are rounded. This is particularly advantageous because it makes it possible to avoid any risk of tearing if said edges 12 were to touch the wall of the preform 3, for example during the stretching phase. This variant of rounded edges 12 of the skirt 11 can also be applied to other embodiments of the invention.

In this exemplary embodiment, the annular skirt 11 has the same diameter as the diameter of the body 4 of the stretching rod 1. On the flat 7, five orifices 9 are disposed around the protruding end-fitting 8.

Furthermore, as can be seen in FIG. 8, the annular skirt 11 has a height 110 less than the height 80 of the end-fitting 8 such that said end-fitting 8 protrudes from the annular skirt 11. In other words, the distal end of the stretching rod 1 is formed by the end-fitting 8 and the annular skirt 11 is an extension of the outer body 4 with respect to the flat 7. That makes it possible to direct the cooling gas 10 in a controlled manner when it leaves the internal channel 6 through the orifices 9.

In a preferred embodiment, the height 110 of the annular skirt 11 is less than the height 80 of the end-fitting 8 by a value of between 0.5 and 4 millimeters (mm), even more preferentially by a value of 1 mm.

In embodiments, the height 110 of the annular skirt 11 varies over all of its circumference. For example, the annular skirt 11 can have toothed or embellished edges, and therefore have peaks and troughs, as can be seen in FIG. 13. Nevertheless, in this case, the height 110 remains less than the height 80 of the end-fitting 8.

FIG. 8 schematically represents a longitudinal median cross-sectional view of the first embodiment of FIG. 7. The internal channel 6 is divided into different sections to emerge on the orifices 9.

The cooling step is an additional step in a method for manufacturing containers made of PET or of recycled PET ("rPET"). The flow of the cooling gas 10 is represented schematically in FIG. 5 by arrows. This cooling step notably makes it possible to reduce the internal temperature of the container that is obtained, and its aim is to limit the transfer of heat from the inside to the outside after the container 2 that is obtained has been taken from the mold. That also makes it possible to limit the collapsing at the bottom, this collapsing generally having a negative stress impact, which increases the risk of rejects. Indeed, a bottom that has too high a temperature will tend to sag in the step of extraction from the mold.

The container 2 that is obtained can then potentially have leaks or other defects. The presence of the annular skirt 11 according to the invention has the advantage of considerably improving the cooling step by amplifying the action of the injected cooling gas 10, the gas being directed in a localized manner at the point where its presence is necessary. That then makes it possible to considerably improve the step of cooling of the container 2 that is obtained, and therefore achieve an optimal cooling, even when, for production rate reasons, the duration of the cooling step has to be very short.

In embodiments, as represented in FIG. 9, the orifices 9 are oriented slantwise, outward in the direction of the main axis Y, toward the bottom of the blank over a deviation of 1 to 50 degrees.

In a preferred embodiment, the orifices 9 are oriented outward in the direction of the main axis Y, by a deviation of 30 degrees.

The orientation of the orifices allows the cooling gas 10 to be distributed uniformly toward the bottom of the preform 3 and therefore toward the bottom of the container 2 that is thus formed, that is to say over all of its surface. Furthermore, that makes it possible to further improve the cooling of the bottom, at the point where the latter has the highest temperatures, and therefore at the point where stress zones, promoted by its sagging, can develop.

In a preferred embodiment, the skirt 11 has rounded edges and the orifices 9 of the rod are oriented slantwise.

In embodiments, the annular skirt 11 of the stretching rod 1 have straight and beveled edges. This embodiment is illustrated in FIG. 9.

In an embodiment illustrated in FIG. 10, the annular skirt 11 has a crenelated form with rounded and convex peak edges and concave trough edges.

In embodiments in which the annular skirt 11 has peaks and troughs, the orifices 9 can be aligned with a trough or with a peak. According to a preferred embodiment, the orifices 9 are aligned with a peak, in order to concentrate the cooling gas on the bottom of the container 2.

In another variant, as illustrated in FIG. 11, the annular skirt 11 has a diameter that converges from the body 4 of the rod 1 toward the protruding end-fitting 8. In other words, its diameter decreases toward the free end portion and the annular skirt 11 therefore has a narrowed form. The annular skirt 11 has a section which decreases from the flat 7, to its distal free end.

According to another variant, not represented, the diameter of the annular skirt 11 is greater than the diameter of the body 4 of the stretching rod 1. The annular skirt 11 then has a flared form. The expression "flared form" will be understood to mean a form whose section increases. Thus, a free end portion of annular skirt 11 of flared form means that the end portion of said skirt has a section which enlarges from the flat 7 to its free end.

FIG. 12 shows another view of the rod 1 according to the invention, with a skirt 11 having an annular edge inscribed in a same plane, as well as the end-fitting 8 and the flat 7 in dotted lines.

FIGS. 13 to 15 show variant embodiments of the annular skirt 11, having troughs and peaks.

FIG. 13 shows a skirt 11 with straight crenelated edges, with peaks and troughs, with a skirt height 110 still less than the height of the end-fitting 8.

FIG. 14 shows an exemplary embodiment in which the skirt 11 has rounded crenelated edges.

FIG. 15 shows an embodiment in which the skirt 11 has edges that are smooth and of constant height, but in which the flat 7 has a recess in the form of an inner rosette. The inner rosette is centered in the recess of the flat 7 with respect to the end-fitting 8 and extends over the recess of said flat 7 to the edges of the skirt 11.

Advantageously, it can be hollowed out in the flat 7. According to other embodiments, the inner rosette has edges. In this way, the skirt 11 and the edges of the inner rosette form a double wall.

According to embodiments, the edges of the inner rosette have a height less than or equal to the height 110 of the skirt 11. According to a variant, the edges of the inner rosette have a height less than the height 80 of the end-fitting 8. This embodiment advantageously makes it possible to channel the cooling gas 10 and further improve its direction toward the bottom of the container 2.

Advantageously, each orifice 9 is situated at a vertex of a branch of the inner rosette.

The invention relates also to a method for manufacturing a container 2 by stretch blow-molding implementing the stretching rod 1 previously described.

The manufacturing method according to the invention comprises at least the following steps of:
  placing a previously heated preform 3 in a blowing mold 14 having, in closure position, a molding cavity 15 forming the die of the container 2 to be blown;
  closing said blowing mold 14;
  blowing said preform 3 in the blowing mold 14 via a blowing nozzle 16 and, substantially simultaneously, a step of stretching said preform 3 by inserting the stretching rod 1 into said preform 3 to bear against the bottom 30 of said preform 3 so as to facilitate the axial elongation of said preform 3;
  cooling the inside of said container 2 that is thus formed by the injection of a cooling gas 10, usually air, via said stretching rod 1, provided with a plurality of orifices 9 provided for that purpose;
  retracting said stretching rod 1;
  gripping the blown container 3 by external handling means;
  opening said blowing mold 14.

FIG. 1 represents a top view which schematically represents an exemplary embodiment of a molding machine of rotary type and which illustrates the molding units 18 (without the blowing and stretching means) distributed circumferentially over the carousel 170 and which, depending on their relative position with respect to the input or the output of the machine, are in open position or in closed position. The manufacturing of a container 2 is performed by blowing a hot preform 3 in a mold 14 of a molding unit 18 of the installation by means of at least one pressurized fluid, generally air.

In the exemplary embodiment, the manufacturing of the containers 2 is performed by stretch blow-molding. The blowing means advantageously incorporate at least one stretching rod 1.

The stretching rod 1 is driven axially, along the axis Y, in displacement by associated driving means (not represented).

The stretching rod 1 is therefore mounted to slide axially so as to be introduced into the preform 3 through the opening delimited radially by its neck 32, an annular space being left free between the neck 32 and the rod 1 to allow passage of the blowing fluid. The stretching rod 1 is mounted to be axially movable between at least one first, high position and one second, low position.

In the first position, the rod 1 extends out of the mold 14 and, in the second position, called low position, the rod 1 is displaced downward to axially stretch the preform 3 inside the mold 14, during the blowing.

FIGS. 3 to 5 illustrate some of the steps in manufacturing a container 2 and the different positions of the stretching rod 1 during these steps.

A first step, as can be seen in FIG. 3, therefore relates to the introduction of a preform 3 into a blowing mold 14. The preform 3 has been previously heated to a temperature greater than the glass transition temperature of the material (which is approximately 80° C. in the case of PET).

Once the preform 3 is in position and the mold 14 is closed, as can be seen in FIG. 4, the stretching rod 1 is inserted into the preform 3, to come into the low position, that is to say that it is positioned on the bottom of the preform 3.

In a preferred embodiment, the low position of the stretching rod 1 corresponds to a position in which the end-fitting 8 touches the bottom of the preform 3.

In other embodiments, the low position of the stretching rod 1 corresponds to a position in which the end-fitting 8 is slightly set back from the bottom of the preform 3. Substantially simultaneously with the insertion of the stretching rod 1 into the preform 3, the blowing step, or the stretch blow-molding step, takes place during which a fluid (for example air) is injected into the preform 3, first at a median, so-called pre-blowing pressure of between 5 bar and 15 bar, while displacing the stretching rod 1 from its high position to its deployed low position.

The blowing step ends with a momentary increase in pressure to a high pressure, greater than the pre-blowing pressure, to make sure that the material is well pressed against the cavity 15 of the blowing mold 14 and thus impart on it the die of the container 2, as represented in FIG. 4. The blowing pressure is greater than or equal to bar, and for example approximately 35 to 40 bar.

The stretching rod is maintained in the deployed position to avoid any unwanted slippage of material on the bottom of the mold as long as the pressure in the container has not reached the blowing pressure.

There follows a cooling step performed by the injection of a cooling gas 10 toward the bottom of the container 2 that is thus formed. The stretching rod 1 is then in low position, as can be seen in FIG. 5.

According to embodiments, the cooling step, also called sweeping step, consists in accelerating the cooling of the container 2 from the inside. In an embodiment illustrated in FIG. 5, the stretching rod 1, in low position, performs the cooling step. The output of the gas 10 is represented by arrows.

In embodiments, the stretching rod 1 is displaced axially inside the molding cavity 15 during said cooling step to axially perform a sweep of the molding cavity 15, for example from the top to the bottom and vice versa, along a determined travel. In variants, the stretching rod 1 is driven selectively in rotation to perform a circular sweep of each molding cavity 15 of the molds 14 cooled by means of said at least one cooling gas 10.

The stretching rod 1 is for example driven continually on itself to perform a sweep over 360 degrees or, in a variant, sequentially.

The driving of the stretching rod 1 in rotation is performed advantageously in combination with the axial displacement of said rod, the assembly being controlled by selectively controlling the driving means.

Finally, at the end of the cooling step, the mold 14 is opened and the formed container 2 is discharged from it, which loops the cycle. A new cycle can then begin with the introduction of a new preform 3.

The implementation of a stretching rod 1 according to the invention allows a better control of the cooling step. Through this improved control, it is possible to increase the blowing rates, while limiting the diffusion of heat from the inside to the outside. Moreover, an improved cooling of the bottom of the container 2 makes it possible to limit the risks of sagging.

Furthermore, the use of such a stretching rod 1 offers greater flexibility in the use of a preform, notably those whose form would not be perfectly suited to a bottle. It has finally been found that the use of the stretching rod 1 according to the invention makes it possible to accelerate the cooling of the bottom 30 of the preform 3, while reducing the number of containers 2 of unsatisfactory quality. This is directly linked to the design of the stretching rod 1, which now comprises an annular skirt 11, making it possible to direct the cooling gas 10 in a precise and controlled manner toward the bottom of the container 2 that is thus formed.

The invention claimed is:

1. A stretching rod for a molding unit for manufacturing a container from a preform, said stretching rod extending longitudinally, parallel to a main axis, comprising; an outer body of cylindrical or tubular form;
    a distal end in the extension of said body;
    at least an internal channel to allow circulation of a cooling gas to said distal end;
    a flat situated at the distal end of the stretching rod;
    an end-fitting protruding from said flat, and a plurality of orifices said orifices being fluidically connected with said internal channel and being distributed around said end-fitting on said flat;
    wherein said rod being characterized in that it comprises an annular skirt in the extension of said body, at said distal end, said skirt having a height less than a height of said end-fitting.

2. The stretching rod as claimed in claim 1, wherein edges of said skirt are rounded and/or of the end of said end-fitting is rounded, are rounded or both.

3. The stretching rod as claimed in claim 1, wherein the outer body and the skirt comprise a single piece.

4. The stretching rod as claimed in claim 1, wherein the end-fitting is of conical form.

5. The stretching rod as claimed in claim 1, wherein the flat extends orthogonally to the main axis.

6. The stretching rod as claimed in claim 1, wherein the orifices are oriented outward in the direction of the main axis, and by an angle of between 1 and 50 degrees.

7. The stretching rod as claimed in claim 1, wherein the annular skirt has a crenelated form.

8. The stretching rod as claimed in claim 7, wherein the annular skirt has a crenelated form with rounded and convex peak edges and concave trough edges.

9. The stretching rod as claimed in claim 1, wherein the flat has a recess in the form of an inner rosette.

10. A method for manufacturing a container by stretch blow molding implementing the stretching rod as claimed in claim 1, comprising at least the following steps of;
   placing a previously heated preform in a blowing mold having, in closure position, a molding cavity forming the die of the container to be blown;
   closing said blowing mold;
   blowing said preform in the blowing mold via a blowing nozzle and, substantially simultaneously, a step of stretching said preform by inserting the stretching rod into said preform by bearing against a bottom of said preform so as to facilitate an axial elongation of said preform; cooling an interior of said container thus formed by injection of air via said stretching rod, provided with said plurality of orifices provided for that purpose, retracting said stretching rod;
   extracting a blown container by opening said blowing mold.

11. The stretching rod as claimed in claim 6, wherein the angle is 30 degrees.

* * * * *